United States Patent [19]
Nakamura et al.

[11] 3,818,484
[45] June 18, 1974

[54] POWER SUPPLY CIRCUIT FOR ELECTRONIC DIGITAL SYSTEM

[75] Inventors: Tsutomu Nakamura, Akashi; Mitsuo Morihisa, Nara, both of Japan

[73] Assignee: Sharp Kabushiki Kaisha, Osaka, Japan

[22] Filed: Dec. 29, 1972

[21] Appl. No.: 319,235

[30] Foreign Application Priority Data
Dec. 29, 1971 Japan.............................. 46-1047
July 2, 1972 Japan............................. 47-77781
Sept. 1, 1972 Japan............................. 47-88218

[52] U.S. Cl................. 340/324 R, 58/23, 321/15, 340/336
[51] Int. Cl........................ G02f 1/18, H02m 3/32
[58] Field of Search......... 340/324 R, 336; 307/264, 307/109, 110; 321/15; 350/160 LC; 58/23

[56] References Cited
UNITED STATES PATENTS
2,975,353   3/1961   Rockstuhl............................ 321/15
3,505,804   4/1970   Hofstein.............................. 340/336
3,739,254   6/1973   Kojima et al. ........................ 321/15

*Primary Examiner*—John W. Caldwell
*Assistant Examiner*—Marshall M. Curtis
*Attorney, Agent, or Firm*—Stewart and Kolasch, Ltd.

[57] ABSTRACT

The present disclosure is directed to a power supply circuit for an electric or electronic digital system which is operative in response to timing pulses. The timing pulses are fed to a voltage multiplier of the Cockcroft type or Schenkel type which provides a higher voltage. To effectively obtain a higher voltage, a pair of timing pulses having opposite phases are simultaneously fed to the multiplier through a buffer stage of complementary-symmetry MOS devices (CMOS).

14 Claims, 8 Drawing Figures

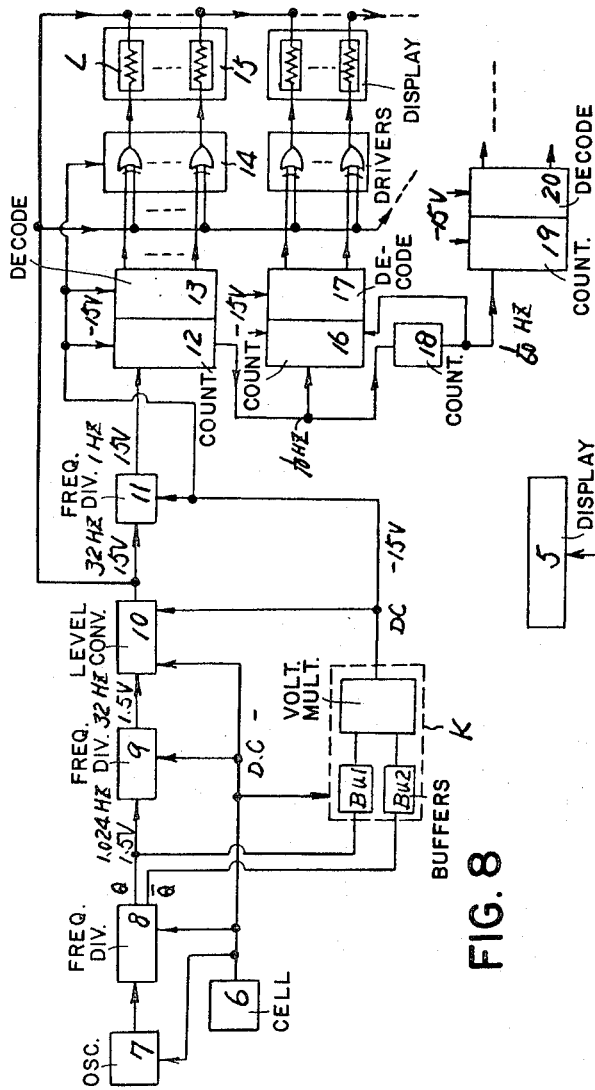
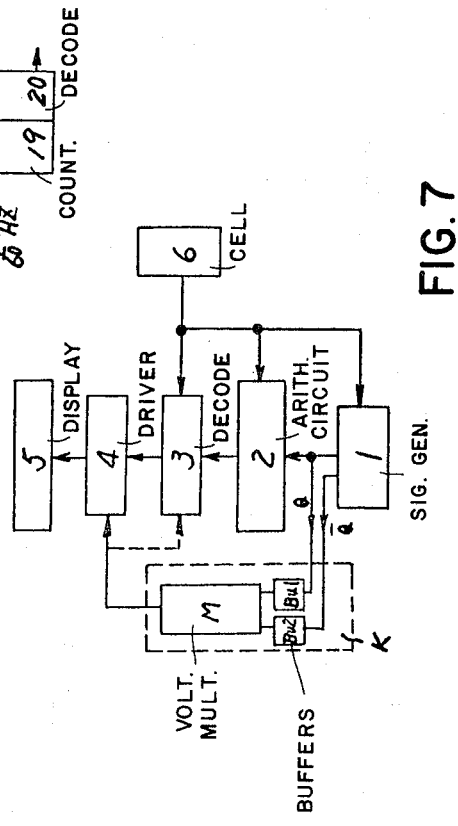
FIG. 7
FIG. 8

3,818,484

POWER SUPPLY CIRCUIT FOR ELECTRONIC DIGITAL SYSTEM

BACKGROUND OF THE INVENTION

This invention relates to a power supply circuit for an electric or electronic digital system, and more particularly to an improved power supply circuit capable of operating a liquid crystal display unit with an energy cell having only a comparatively low voltage.

Various electric or electronic digital systems, for example, electronic desk calculators and electronic digital clocks have been miniaturized up to the pocket size with the development of large scale integration techniques. However, an energy cell capable of activating the electronic digital system for a long time without recharging is needed. To resolve this problem various solutions have been suggested and in fact various elements and devices have been contrived. For example, one solution is to manufacture long life mercury cells. Another solution is to employ as circuit elements complementary-symmetry MOS IC's with reduced power dissipation and as indication units, liquid-crystal display devices having a high impedance and reduced power dissipation.

The output voltage from mercury cells and silver oxide cells are about 1.3 to 1.5 volts while the activating voltages for liquid-crystal devices are over 15 to 20 volts. Furthermore, the complementary MOS devices have a high impedance as well as the liquid-crystal devices. Therefore, a great gap between the cell output voltage and liquid-crystal activating voltage must be filled under conditions where a load has a high resistance and the electronic system should not be large-sized as a whole. This type of problem has been left unsolved, although prior art devices have been suggested in order to solve such problem, for example, the use of a transformer or a series combination of cells.

OBJECTS AND SUMMARY OF THE INVENTION

Accordingly, the primary object of this invention is to provide a power supply circuit which provides a high voltage capable of effectively operating a liquid-crystal display device by using timing pulses required in and associated electric or electronic digital system.

Another object of this invention is to provide a power supply circuit which provides efficiently a higher voltage by using two phase-inverted timing pulses.

Still another object of this invention is to provide a power supply circuit which is suitable for a high impedance load and capable of being incorporated into a hybrid IC device by employing a voltage multiplier of the Cockcroft type or Schenkel type.

A further object of this invention is to provide a boost circuit utilizing a diode with an extremely low leakage current to improve efficiency.

It is still a further object of this invention is to provide a power supply circuit wherein timing pulses are applied through a buffer stage made up of the complementary MOS transistor devices to a boost circuit for the purpose of obtaining an electronic digital system with extremely low power dissipation and high efficiency.

Another object of this invention is to provide an electronic digital wrist watch having an extremely low power dissipation and a long life time.

In summary, the solution to the previous problems according to this invention consists essentially in applying timing pulses or time reference pulses equal to the cell voltage level as inputs to a Cockcroft or Schenkel type voltage-multiplier to obtain a high voltage capable of activating a liquid-crystal display device thus effecting improvements in miniaturization and efficiency. It becomes unnecessary to employ a transformer or a series combination of the cells for obtaining the high voltage. The electronic digital system equipped with the liquid-crystal display device is allowed to be compact and operate for a long time without recharging the energy cell. In particular, the invented system does not require provision of an oscillator or DC-AC converter since the timing signals essentially required in the electronic system are utilized and boosted to obtain a higher voltage than the cell voltage.

BRIEF DESCRIPTION OF THE DRAWINGS

FIG. 7 is a schematic diagram showing the general construction of an electronic digital system embodying this invention.

FIG. 8 is a schematic diagram showing an electronic digital wrist watch embodying this invention.

DESCRIPTION OF THE PREFERRED EMBODIMENTS

Figure 1:
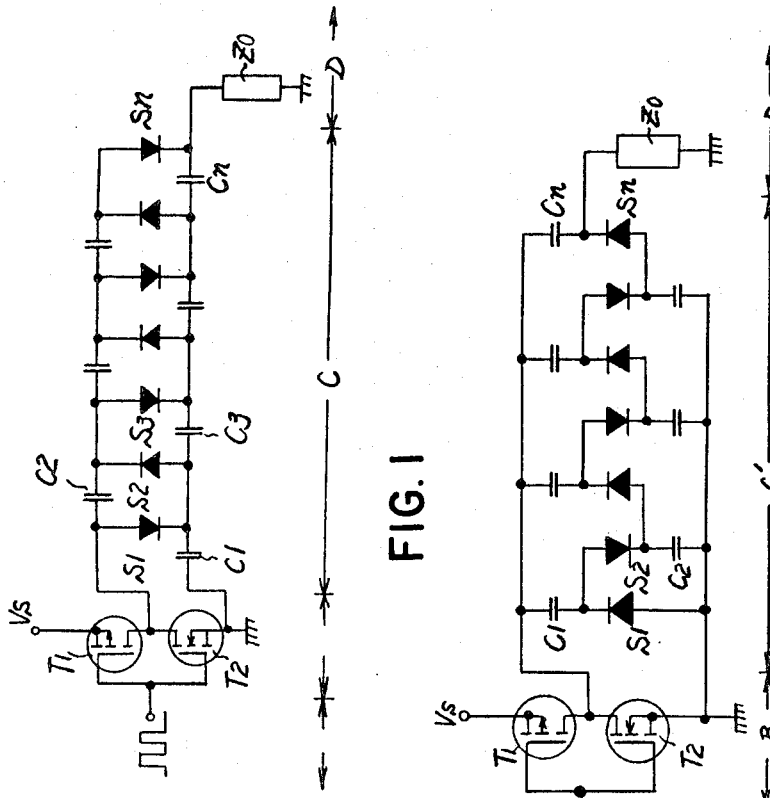
FIG. 1 is a circuit diagram showing one example of a booster arrangement utilizing the Cockcroft type voltage multiplier according to this invention.

Referring now to FIG. 1, there is illustrated an exemplary booster arrangement which comprises an alternating voltage input stage A, an inverter stage B, a Cockcroft type voltage multiplier stage C and a load circuit D. The signals to be applied to the input stage A may be alternating voltage signals capable of controlling the ON, OFF status of the next inverter stage B, preferably pulse signals having a duty factor of 50 percent. In this instance the pulse signals, more particularly clock pulse signals are utilized as input signals to the inverter stage A.

The inverter circuit B is made up of a complementary-symmetry MOS transistor circuit (COS MOS) containing series-connected P-channel MOS transistor $T_1$ and N-channel MOS transistor $T_2$, and provides pulse signals having substantially a bias voltage level $V_s$ to the Cockcroft voltage multiplier C in the next stage. The COS MOS transistor devices are employed for the purpose of reducing the power dissipation and gaining impedance matching between the timing pulse circuit and the voltage multiplier circuit. The COS MOS inverter circuit B provides a high output voltage with extremely low power dissipation and high efficiency.

The Cockcroft voltage multiplier C is of multistage construction each stage including the capacitors $C_1$, $C_2$ and diodes $S_1$, $S_2$, and the individual capacitors $C_1$, $C_2$, ... $C_n$ are series connected looking from the output side. This booster arrangement consisting of only capacitors and diodes permits hybrid circuit integration and miniaturization of circuit construction. Since the multiplier C boosts the cell voltage due to charge accumulation by the capacitors, the load circuit D should have a high impedance so as to obtain the high voltage. Use of a liquid-crystal device and associated COS MOS devices is suitable for the above condition.

Figure 2:
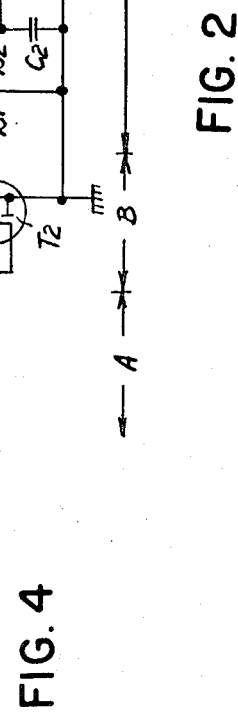
FIG. 2 is a circuit diagram showing another example of a booster arrangement utilizing the Schenkel type voltage multiplier.

The booster arrangement illustrated in FIG. 2 utilizes a Schenkel voltage-multiplier $C'$ in substitution for the Cockcroft multiplier C. The Schenkel circuit is similarly of multistage construction each stage including the capacitors $C_1$, $C_2$ and diodes $S_1$, $S_2$, but the individual capacitors $C_1$, $C_2$ ... $C_n$ are parallel connected, this differing from the Cockcroft type. As will be described hereinafter, it has been found from inventors' experiments that the Schenkel type multiplier has a higher efficiency and provides a higher voltage than the Cockcroft type.

Figure 3:
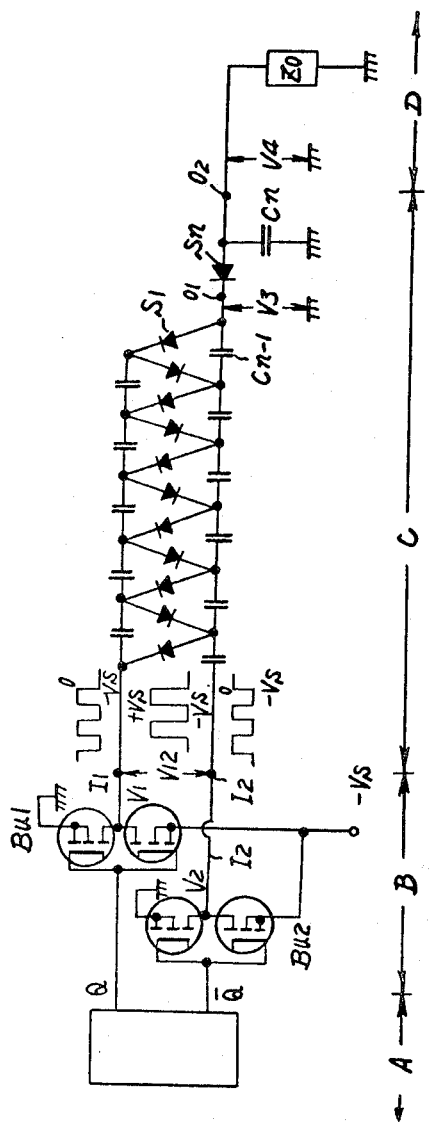
FIG. 3 is a circuit diagram showing still another example of a booster arrangement to which two phase-inverted timing pulses are applied.

In the booster circuits illustrated in FIGS. 1 and 2, the individual capacitors $C_1$ to $C_n$ are not charged during half cycles where the input pulse signals are at a zero level. FIG. 3 discloses another example of the booster circuit wherein two phase-inverted pulse signals Q and $\bar{Q}$ are employed to effect improvements to remedy this. The two phase-inverted pulse signals Q and $\bar{Q}$ are respectively applied via the buffer circuit Bu1 and Bu2 to both input terminals of the Schenkel booster circuit C and accordingly the pulse circuit signal voltage level applied to the booster circuit becomes equivalent to a doubled voltage level $2Vs(P-P)$. The buffer circuits $Bu1$ and $Bu2$ are made up of inverter circuits of COS MOS transistor devices.

The operation of the FIG. 3 circuit will be described below with reference to FIG. 4 for the better understanding. When $-Vc$ is the voltage level at one input terminal $I_1$ of the booster circuit connected with the output terminal of the buffer circuit $Bu1$, the voltage at the other input terminal $I_2$ of the booster circuit associated with the buffer circuit $Bu_2$ is held at zero volts. Conversely, when the voltage at the input terminal $I_1$ is at zero volts, the other input terminal $I_2$ voltage is $-Vs$ volts. Therefore, as shown by the reference $V_{12}$ in FIG. 4, pulse signals having a doubled amplitude $2Vs$ are applied between both the input terminals $I_1$ and $I_2$. The pulse signals of the amplitude $2Vs$ are boosted by the booster circuit of the Cockcroft type or Schenkel type. In theory the voltage level of the output signal will be twice as high as that of the one input signal Q. In the case where the booster circuit is of $n/2$ stage comprising $(n-1)$ capacitors and diodes, an output voltage of the amplitude $-nVs$ will be obtained.

Figure 4:
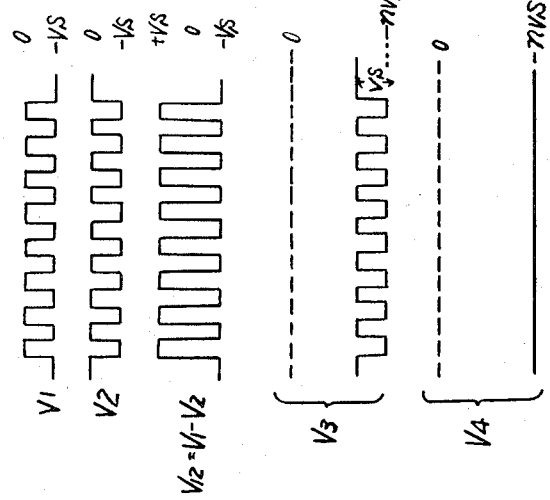
FIG. 4 is a time chart showing the relation of the various pulses which occur in the circuit shown in FIG. 3.

Since the output signal V3 at the output terminal $O_1$ includes a ripple of the amplitude $Vs$, such ripple is flattened by the diode $Sn$ and capacitor $Cn$ and then the flattened DC high voltage signal of $-nVs$ is derived from the output terminal $O_2$ as shown by the reference V4 in FIG. 4. Whether the output voltage is negative or positive with respect to the ground potential is dependent upon the polarities of the connected diodes $S_1$ to $S_n$. In the case of FIG. 3 wherein the load circuit D is connected with the anodes of the diodes $S_1$ to $Sn$ the negative output voltage is derived from the output terminal $O_2$.

Figure 5:
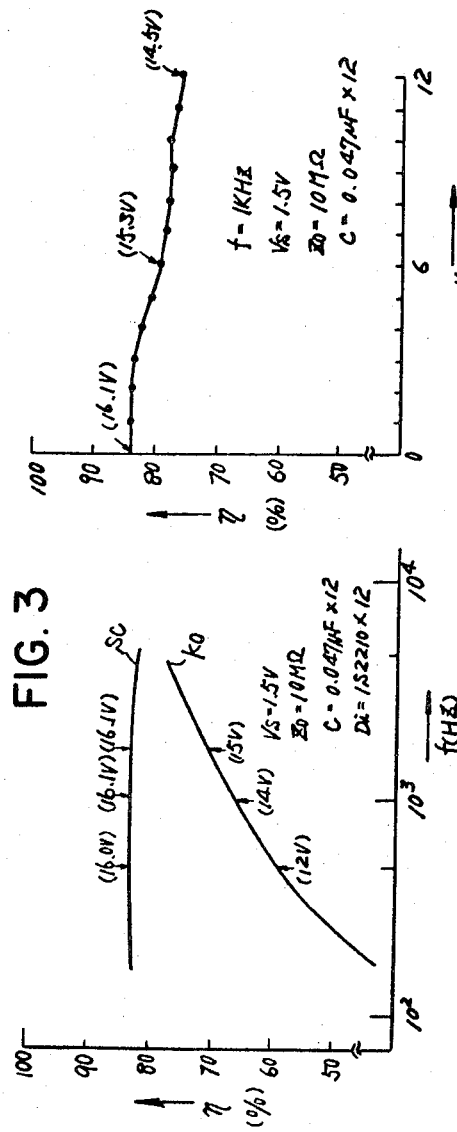
FIG. 5 is a graphic presentation of change in efficiency of the booster arrangements as a function of the frequency.

FIG. 5 shows change in the efficiency $\eta$ of the booster circuit in the case where the two phase-inverted pulse signals Q and $\bar{Q}$ are applied as the input signals to the booster circuit. In this drawing the ordinate is graduated by the frequency $f(Hz)$ of the pulse signal Q and the abscissa by the efficiency $\eta$.

As commonly known, the efficiency $\eta$ of the booster circuit is defined by the following formula.

$\eta =$ [output voltage $(V4)$ × output current $(I4)$]/[input voltage $(Vs)$ × input current $(Is)$] × 100 (%)

In FIG. 5 the curve Sc represents the efficiency of the Schenkel type voltage-multiplier of six stage construction while the curve Ko represents the Cockcroft type of the six stages. The experiments have been carried out under the following conditions: input voltage $Vs = 1.5$ volts, capacitance of capacitors $C_1$ to $C_n = 0.047\mu F$ (polystyrene film capacitor), kind of diodes $S_1$ to $S_n = 1s2210$ (Schottky barrier type silicon diode), load impedance $Zo = 10$ M$\Omega$. The numerals on the curves Sc and Ko indicated by the arrows shows the output voltage V4 at that frequency. As may be seen from FIG. 5, in the case of the frequency $f = 1Khz$, the Cockcroft type provides the output voltage $V4 = 14$ volts and the efficiency $\eta = 66$ percent whereas the Schenkel type provides the output voltage $V4 = 16.1$ volts and the efficiency $\eta = 83$ percent. Hence the Schenkel type is superior to the Cockcroft type in efficiency, voltage gain and frequency stability.

Although there are various factors having influence on the efficiency and voltage gain in the booster circuit arrangement, the diode characteristic is considered to be the most important factor. Furthermore, it has been found from the experimental results that drops of the efficiency and output voltage are caused by the following reasons: First, the capacitors are charged to a lower voltage level due to the forward voltage drop in the diodes $S_1$ to $Sn$. Second, the charges accumulated in the capacitor leak due to inverse current in the diodes $S_1$ to $Sn$.

According to the experimental results Si diodes with small inverse current characteristics are superior to Ge diodes with large inverse current characteristics in the efficiency and voltage gain in the booster arrangement. Furthermore the Schottky barrier type diode-including circuit provides the highest output voltage among various types of the Si diodes. As is well known in the semiconductor art, the Schottky barrier type is a kind of diode having a PN junction doped with dopants, Mo, etc. and operative under the Schottky effect. It has several merits in that its forward voltage is low (less than 0.3 volts) and its inverse current is small (less than 1 A).

Figure 6:
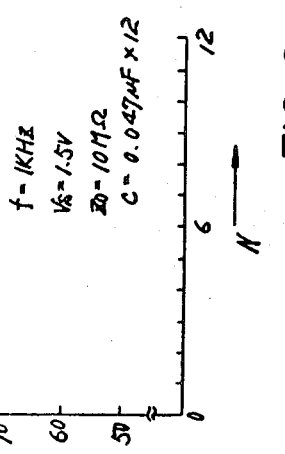
FIG. 6 is a graphic presentation of change in efficiency of the Schenkel type voltage multiplier as a function of the number of replaced diodes of another type.

FIG. 6 is the plot showing change in the efficiency of the Schenkel type booster circuit of 6 stage construction in the case where 12 Schottkey barrier type Si diodes $1s2210$ are successively replaced by the conventional Si diodes $1s$ 1588. The abscissa is graduated by the number $N$ of the replacing conventional $Si$ diodes and the ordinate by the efficiency $\eta$ (%). The measurments have carried out under the conditions: $f = 1KHZ$, $C =$ less than 0.047 $\mu F$, $Vs = 1.5$ volts, $zo = 10$ M$\Omega$. As will be seen from FIG. 6, the efficiency of the booster circuit using only the Schottkey barrier type Si diodes is 84 percent (output voltage 16.1 volts). However, when the six Schottkey barrier diodes are replaced by the conventional ones, the efficiency is lowered to 79 percent (output voltage 15.3 volts). When all of the diodes are replaced, it is further lowered to 76 percent (output voltage). It will be understood that the Schenkel type voltage-multipliers utilizing the Schottkey barrier Si diodes are the best ones for purposes of this invention. Although polystyrene film capacitors having an extremely high insulation resistance efficiency and other electric characteristics, ceramic laminated capacitors having a small ratio of volume to capacitance, on the other hand, are advantageous for miniaturization and circuit integration.

In FIG. 7 there is shown the construction of an electronic digital system designed in accordance with this invention. The numeral 1 represents a generator which generates clock pulses or other timing signals based upon the clock pulses with frequency-division. In one example, for electronic desk calculators this timing signal generator 1 corresponds to clock pulse generators, bit time counters, digit time counters and so on, and in another example, for electronic wrist watches it corresponds to a crystal oscillator or frequency-divider up to 1 Hz. Outputs from the timing signal generator 1 are fed to an arithmetic operation circuit 2 carrying out various arithmetic operations on digital information and two clock pulses Q and Q̄, the phase of one being shifted by 180° with respect to the phase of the other are introduced via buffer circuits B$u$ 1 and B$u$ 2 into the booster arrangement K. The booster arrangement K has the circuit construction as shown in FIG. 3 including the Schenkel or Cockcroft type voltage-multiplier.

In electronic desk calculators the operation circuit 2 corresponds to arithmetic registers, buffer circuits, full-adders and so forth and in the electronic wrist watch it corresponds to counter series deriving various unit signals of tens of seconds, minutes, tens of minutes, hours, 12 hours, one day and so forth in response to the 1 Hz pulse signals.

In a conventional digital system, in order to perform arithmetic operations in a binary fashion, the outputs from the operation circuit 2 are entered into a decoder circuit 3 to provide decimal-coded outputs, which in turn are introduced into an indication driver circuit 4 for a liquid-crystal display device 5. The timing signal generator 1, the operation circuit 2 and the decoder circuit 3 are activated by low voltage (for example, 1.5 volts) from an energy cell 6 such as mercury cell whereas the driver circuit 4 for the liquid-crystal display device 5 is activated by high voltage from the booster circuit K. In some instances the output voltage from the booster arrangement K is applied to the decoder circuit 3 as well as the display driver circuit 4.

FIG. 8 is a block diagram of an electronic digital wrist watch embodying this invention. Means for providing a time reference comprises a high accuracy crystal oscillator circuit 7 from which an output is applied to a first frequency-divider 8. The first frequency-divider 8 is operative to decrease the output frequency of the oscillator circuit 7 to 1,024 Hz and its output Q is introduced into a second frequency-divider 9. The two phase-inverted output pulses Q and Q̄ are applied to the buffer circuits B$u$ 1 and B$u$ 2 associated with the booster unit K. The voltage-multiplier circuit VM connected with the buffer circuits B$u$ 1 and B$u$ 2 converts the pulse signals of 1.5 volts and 1,024 Hz into DC voltage signals of − 15 volts. The second frequency-divider 9 is a 1/32 divider wherein the input signals are frequency-divided to the output signals of 1.5 volts and 32 Hz. These output signals are introduced into a level converter 10 to obtain signals if 15 volts and 32 Hz. A third frequency-divider 11 also is a 1/32 divider converting the input pulses of 15 volts and 32 Hz into 15 volts and 1 Hz.

The oscillator circuit 7, buffer circuit B$u$ 1, B$u$ 2, first and second frequency-dividers and level converter 10 are energized by the DC voltage of −1.5 volts supplied from an energy cell 6. The boosted voltage −15 volts are supplied to the level converter 10 to convert the input pulse signals of 1.5 volts into the output signals of 15 volts.

The 1 Hz pulse signals at the output of the third frequency-divider 11 are entered into a counter 12 and the decoder unit 13 directly connected with the counter 12. The counter 12 is a decimal counter type which counts the first digits (0∼9 seconds) in seconds. The decoder 13 is a code converter associated with a liquid-crystal display device having "8" shaped segments for indicating the numerals 0 to 9. The counter 12 and decoder 13 may be incorporated into a single COS MOS transistor IC device. The outputs of the decoder 13 are coupled to the individual terminals of the selected display segments L of the liquid-crystal display device 15 in the second display place through an exclusive OR circuit. The other terminals of the display segments L receive the pulse signals of 15 volts and 32 Hz from the level converter 10. As a result, in accordance with the signals from the display driver circuit 14, the voltage level −15 volts is applied between both terminals of the selected display segments L to enable the numeral indication. In such manner the liquid-crystal device is AC-actuated which results in long life. Furthermore, the double voltage may be applied across the liquid-crystal device by using the exclusive OR circuit.

The 1/10 Hz signals which are outputs from the counter 12 are introduced into the counter 16 in the tens of seconds digit place and its associated decoder unit 17 and accordingly the numerals in the tens of seconds digit are displayed in the same mode as the seconds digit indication. The outputs are then entered into the hexal counter 18, which provides 1/60 Hz pulse signals in the minutes digit place. It is coupled to the reset terminal of the counter 16 to reset the numerals in the tens of seconds digit place and at the same time is entered into the counter 19 in the minutes digit place. Similarly the numerals in the minutes digit place are displayed by the liquid-crystal device.

All the above-mentioned circuits except the cell 6 and the display device 15 the oscillator circuit 7 and the Cockcroft type voltage-multiplier CK may be incorporated into a single hybrid IC device and the other circuits are all incorporated into a COS MOS transistor IC device.

We claim:

1. An electronic system including a high impedance load, a low-voltage cell for providing a low DC output voltage to said system and a source of alternating timing pulses, a converter circuit for converting the DC voltage from said low voltage cell to a higher DC output voltage suitable for driving said high impedance load comprising voltage multiplier means having an input and an output, the output being connected to provide an output signal to said high impedance load, said voltage multiplier means operating to convert pulse voltage signals at the input thereof to a higher voltage at the output and including a plurality of capacitor-diode stages, each stage including at least one capacitor and diode, and complementary-symmetry inverter circuit means connected to said low-voltage cell, said source of timing pulses and the input to said multiplier means for providing pulse voltage signals to the input of said multiplier means, said inverter circuit means operating to minimize power dissipation while providing impedance matching between said multiplier means and source of alternating timing pulses and including P-channel and N-channel MOS transistors having gate electrodes electrically connected together, drain electrodes electrically connected together and source electrodes, one of sid source electrodes being connected to said low-voltage cell and another source electrode being connected to an electrical ground, the interconnected gate electrodes being connected to the source of alternating timing pulses and the interconnected drain electrodes being connected to the input to said voltage multiplier means.

2. The electronic system of claim 1 wherein the diodes in said multiplier means are of the Schottkey barrier type.

3. The electronic system of claim 1 wherein the multiplier means is a voltage multiplying circuit of the Cockcroft type.

4. The electronic system of claim 1 wherein the multiplier means is a voltage multiplying circuit of the Schenkel type.

5. The electronic system of claim 1 wherein said complementary-symmetry inverter circuit means includes first and second complementary-symmetry inverter circuits, the first complementary-symmetry inverter circuit including first and second MOS transistors of opposite gate channel types which have gate electrodes electrically connected together, drain electrodes electrically connected together and source electrodes, the second complementary-symmetry inverter circuit comprising third and fourth MOS transistors of opposite gate channel types which have gate electrodes electrically connected together, drain electrodes electrically connected together, and source electrodes, the source electrodes of the first MOS transistor of the first inverter circuit and of the third MOS transistor of the second inverter circuit being connected to the low-voltage cell, the source electrodes of the second MOS transistor of the first inverter circuit and the fourth MOS transistor of the second inverter circuit being grounded, said source of alternating timing pulses including means for providing alternating timing pulses of opposite phase to first and second output terminals, said first output terminal being connected to the gate electrodes of the first inverter circuit and the second output terminal being connected to the gate electrodes of the second inverter circuit, the input of said voltage multiplying means including a first input terminal connected to the drain electrodes of said first inverter circuit and a second input terminal connected to the drain electrodes of said second inverter circuit.

6. The electronic system of claim 5 wherein said high impedance load includes a liquid crystal display unit.

7. A digital electronic watch system comprising timing pulse generator means providing a timing pulse signal, arithmetic circuit means for receiving said timing pulse signal and deriving therefrom a seconds output signal, a minutes output signal and an hours output signal, liquid crystal display means for converting said seconds output signal to a visual indication, said minutes output signal to a visual indication and said hours output signal to a visual indication, a low voltage DC cell connected to provide a low DC voltage to said timing pulse generator, and a converter circuit means connected to receive said low DC voltage and said timing pulse signal and operative to convert said low DC voltage to a high DC voltage, said converter circuit means including voltage multiplier means having an input and an output connected to provide an output signal to at least said liquid crystal display means, said voltage multiplier means operating to convert pulse voltage signals at the input thereof to a higher voltage signal at the output and including a network of diodes and capacitors, and complementary-symmetry MOS transistor inverter means connected to receive said timing pulse signal and the low DC voltage from said low voltage DC cell and to provide low voltage pulse signals to the input of said voltage multiplier means.

8. The electronic watch system of claim 7 wherein said timing pulse generator means includes an oscillator and frequency divider means.

9. The electronic watch system of claim 7 wherein said arithmetic circuit means includes counter means for deriving time information in seconds, minutes and hour digit places and providing said seconds, minutes and hours output signals indicative thereof, said liquid crystal display means including driver circuit means connected to receive said seconds, minutes and hours output signals, said driver circuit means being connected to the output of said voltage multiplier means.

10. The electronic watch system of claim 9 wherein said liquid crystal display means includes a plurality of liquid crystal indicators connected to said driver circuit means, said liquid crystal indicators and said arithmetic circuit means being connected to the output of said voltage multiplier means.

11. The electronic watch system of claim 7 wherein said complementary-symmetry MOS transistor inverter means includes first and second complementary-symmetry inverter circuits, the first complementary-symmetry inverter circuit including first and second MOS transistors of opposite gate channel types which have gate electrodes electrically connected together, drain electrodes electrically connected together and source electrodes, the second complementary-symmetry inverter circuit comprising third and fourth MOS transistors of opposite gate channel types which have gate electrodes electrically connected together, drain electrodes electrically connected together, and source electrodes, the source electrodes of the first MOS transistor of the first inverter circuit and of the third MOS transistor of the second inverter circuit being connected to the low voltage DC cell, the source electrodes of the second MOS transistor of the first inverter circuit and of the fourth MOS transistor of the second inverter circuit being connected to an electrical ground, said timing pulse generator means including means for providing alternating timing pulses of opposite phase to first and second output terminals, said first output terminal being connected to the gate electrodes of the first inverter circuit and the second output terminal being connected to the gate electrodes of the second inverter circuit, the input to said voltage multiplier means including a first input terminal connected to the drain electrodes of said first inverter circuit and a second input terminal connected to the drain electrodes of said second inverter circuit.

12. The electronic watch system of claim 11 wherein said voltage multiplier means includes a voltage multiplier circuit of the Schenkel type incorporating diodes of the Schottkey barrier type.

13. The electronic watch system of claim 11 wherein said timing pulse generator means includes an oscillator and frequency divider means connected to receive the output from said oscillator, said frequency divider means operating to provide the alternating timing pulses of opposite phase to said complementary-symmetry MOS transistor inverter means, an said arithmetic circuit means includes counter means for deriving time information in seconds, minutes and hour digit places and providing said seconds, minutes and hours output signals indicative thereof, said driver circuit means being connected to the output of said voltage multiplier means.

14. The electronic watch system of claim 13 wherein said liquid crystal display means includes an EXCLUSIVE OR driver circuit and a liquid crystal indicator for said seconds output signals, for said minutes output signals, and for said hours output signals, said liquid crystal indicators and said arithmetic circuit means being connected to the output of said voltage multiplier means.

* * * * *

UNITED STATES PATENT OFFICE
CERTIFICATE OF CORRECTION

Patent No. 3,818,484             Dated June 18, 1974

Inventor(s) Tsutomu Nakamura et al        Page 1 of 2

It is certified that error appears in the above-identified patent and that said Letters Patent are hereby corrected as shown below:

IN THE CLAIMS:

Claims 7, 9, 13 and 14 should read as follows:

-- 7. A digital electronic watch system comprising timing pulse generator means providing a timing pulse signal, arithmetic circuit means for receiving said timing pulse signal and deriving therefrom a minutes output signal and an hours output signal, liquid crystal display means for converting said minutes output signal to a visual indication and said hours output signal to a visual indication, a low voltage D.C. cell connected to provide a low D.C. voltage to said timing pulse generator and a converter circuit means connected to receive said low D.C. voltage and said timing pulse signal and operative to convert said low D.C. voltage to a high D.C. voltage, said converter circuit means including voltage multiplier means having an input and an output connected to provide an output signal to at least said liquid crystal display means, said voltage multiplier means operating to convert pulse voltage signals at the input thereof to a higher voltage signal at the output and including a network of diodes and capacitors, and complementary-symmetry MOS transistor inverter means connected to receive said timing pulse signal and the low D.C. voltage from said low voltage D.C. cell and to provide low voltage pulse signals to the input of said voltage multiplier means.

9. The electronic watch system of claim 7 wherein said arithmetic circuit means includes counter means for deriving time information in minutes and hour digit places and providing said minutes and hours output signals indicative thereof, said

UNITED STATES PATENT OFFICE
CERTIFICATE OF CORRECTION

Patent No. 3,818,484            Dated June 18, 1974

Inventor(s) Tsutomu Nakamura et al

It is certified that error appears in the above-identified patent and that said Letters Patent are hereby corrected as shown below:

liquid crystal display means including driver circuit means connected to receive said minutes and hours output signals, said driver circuit means being connected to the output of said voltage multiplier means.

13. The electronic watch system of claim 11 wherein said timing pulse generator means includes an oscillator and frequency divider means connected to receive the output from said oscillator, said frequency divider means operating to provide the alternating timing pulses of opposite phase to said complementary-symmetry MOS transitor inverter means, and said arithmetic circuit means includes counter means for deriving time information in minutes and hour digit places and providing said minutes and hours output signals indicative thereof, said driver circuit means being connected to the output of said voltage multiplier means.

14. The electronic watch system of claim 13 wherein said liquid crystal display means includes an EXCLUSIVE OR driver circuit and a liquid crystal indicator for said minutes output signals, and for said hours output signals, said liquid crystal indicators and said arithmetic circuit means being connected to the output of said voltage multiplier means. --

Signed and Sealed this second Day of March 1976

[SEAL]

Attest:

RUTH C. MASON
*Attesting Officer*

C. MARSHALL DANN
*Commissioner of Patents and Trademarks*